Figure 2:
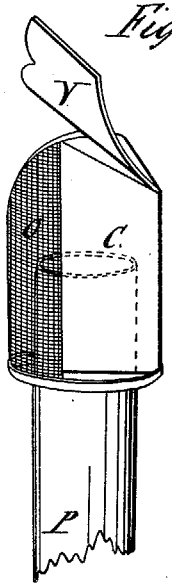
Figure 1:
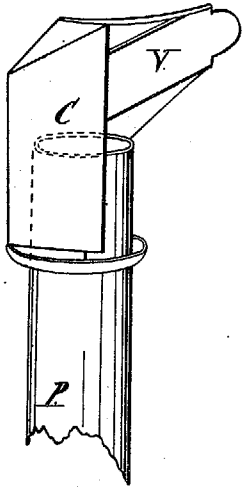

7625X

J. P. Espy.

Chimney Cowl.

Patented Jun. 29, 1833.

17 7625X June 29, 1833

James P. Espy Philadelphia Pennsylvania
Letters Patent Dated June 29th 1833.

The Schedule referred to in these Letters Patent, and making part
of the same, containing a description in the words of the said James
P. Espy himself of his Improvement in the Chimney Cap, for increas-
ing the draft in furnaces of Steamboats & Locomotive engines.

---

To all to whom these Presents shall come:

Be it known that I James P. Espy of the City of Philadelphia & —
State of Pennsylvania, have invented a new & useful Improvement
which I call a draft generating chimney-Cap, for increasing the
draft in the furnaces of Locomotive engines & Steam-boats, & for pre-
venting the emission of Sparks from their chimneys, & that the follow-
ing is a full & exact description of the construction, application &
operation of the said draft generating Chimney-cap as applied to —
the above purposes by me. The drawing & model deposited in the Patent
Office represent a portion of the upper part of the chimney with the cap
surmounting it, connected with a vane which may be either above or —
below, provided it is long enough to turn the angle of the cap always to —
the wind. This angle (it is believed may vary from fifty to ninety
degrees, without materially varying the effect, whilst the angle of
the upper covering of the cap, which slopes upwards from the wind
should be from forty to sixty with the horizon —

As the object is to produce a partial vacuum over the top
of the chimney, when the Locomotive, or Steam-boat is in motion,
it is manifest that the draft will be increased by enlarging
the cap, both because the vacuum will be greater, & a freer egress
will be allowed to gas from the chimney, & on this account particular
care must be taken to have the upper covering of the cap, so high
above the top of the chimney as to allow a very free egress of the —
smoke, from the chimney into the cap. In the cap which I

7625X have had made to test the theory by experiment, & which has been completely successful, a wire so fine, that a pin's head can hardly be thrust thro' the meshes, has been used it is about thirteen or fourteen times the area of the top of the chimney & thus affords a very free egress to the gasses, whilst it completely stops the sparks. — When it is in its place on the chimney the wire stands perpendicular to the horizon, & the sparks after striking against it, finally fall down & nearly leave the passage free. —
And it is hoped, that by making a few small holes, in the lower plate of the cap near the wire to admit a small portion of atmospheric air, these sparks will burn & thus save the trouble of cleaning out the cap by hand.

The cap should be so nicely balanced as to turn freely to the wind; at the same time, it should fit so closely to the chimney as to let in as little air as possible into the cap; for every particle which thus enters diminishes the draft. —

The cap itself is made of sheet iron, & the lower plate which goes round the chimney, & fits close to it is horizontal in the experiment model & in the model deposited in the Patent Office; but any intelligent mechanic, who understands the operation of the machine in causing a partial vacuum will easily know how to vary the proportions of the cap, without materially injuring the effect.

Where draft only is required, it may be made very strong by not using the wire.

What I claim as new in the above arrangement, is the application of a machine, which I call a draft generating chimney cap, to the top of chimneys in steam boats & locomotive engines, to increase the draft, by causing a partial vacuum over the top of the chimney, & thus permitting the use of a wire gauze to prevent the emission of sparks without materially diminishing the draft.

Witnesses { Stephen Duncan
A Dettel [illegible]

James P. Espy

Ent. 1856.

Drawing ([illegible])